Figure 1:
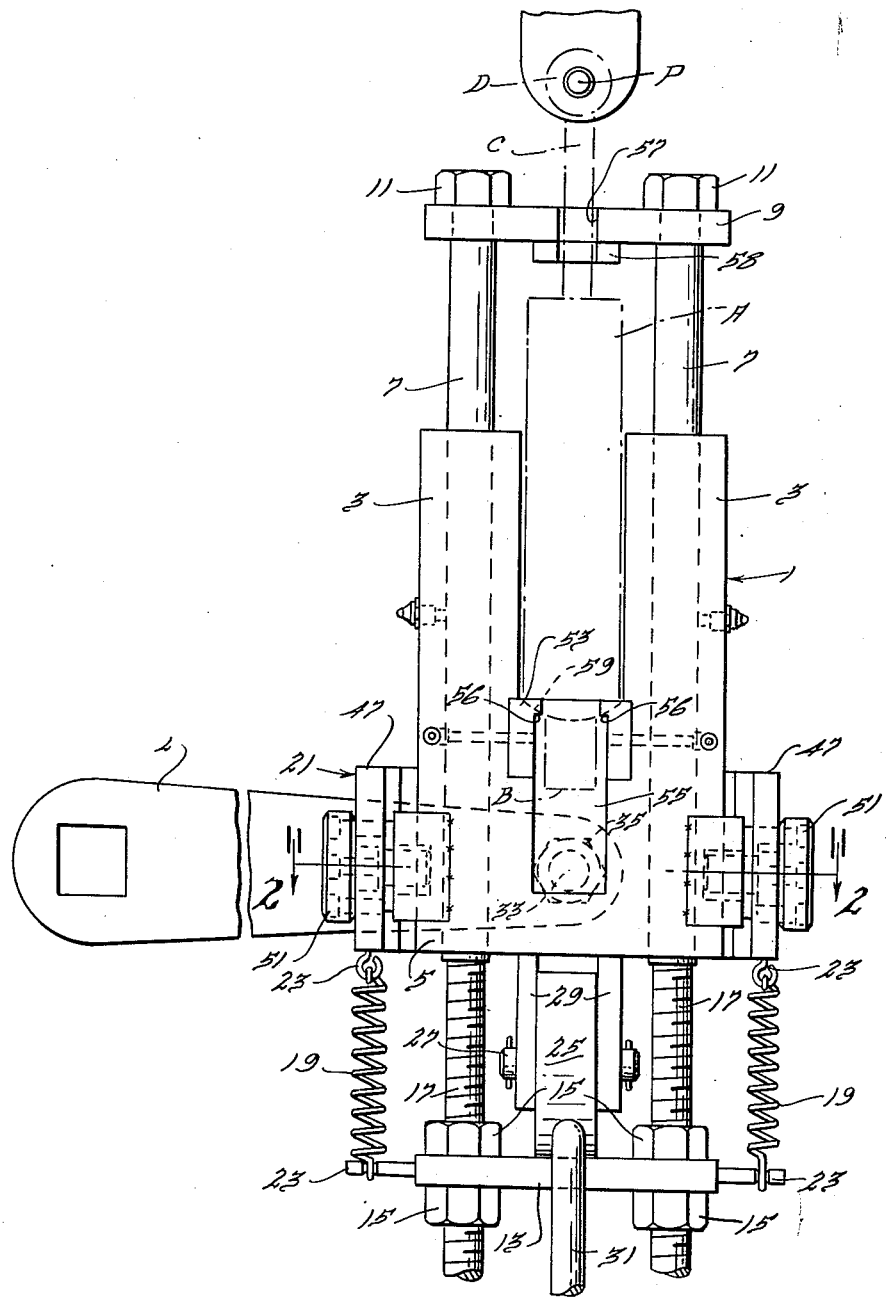

Aug. 17, 1954

K. R. THOMPSON 2,686,423

TESTING FIXTURE FOR SHOCK ABSORBERS

Filed Oct. 20, 1949

2 Sheets-Sheet 1

INVENTOR.
Keith R. Thompson
BY
Harness, Dickey & Pierce
ATTORNEYS.

Aug. 17, 1954
K. R. THOMPSON
2,686,423
TESTING FIXTURE FOR SHOCK ABSORBERS
Filed Oct. 20, 1949
2 Sheets-Sheet 2
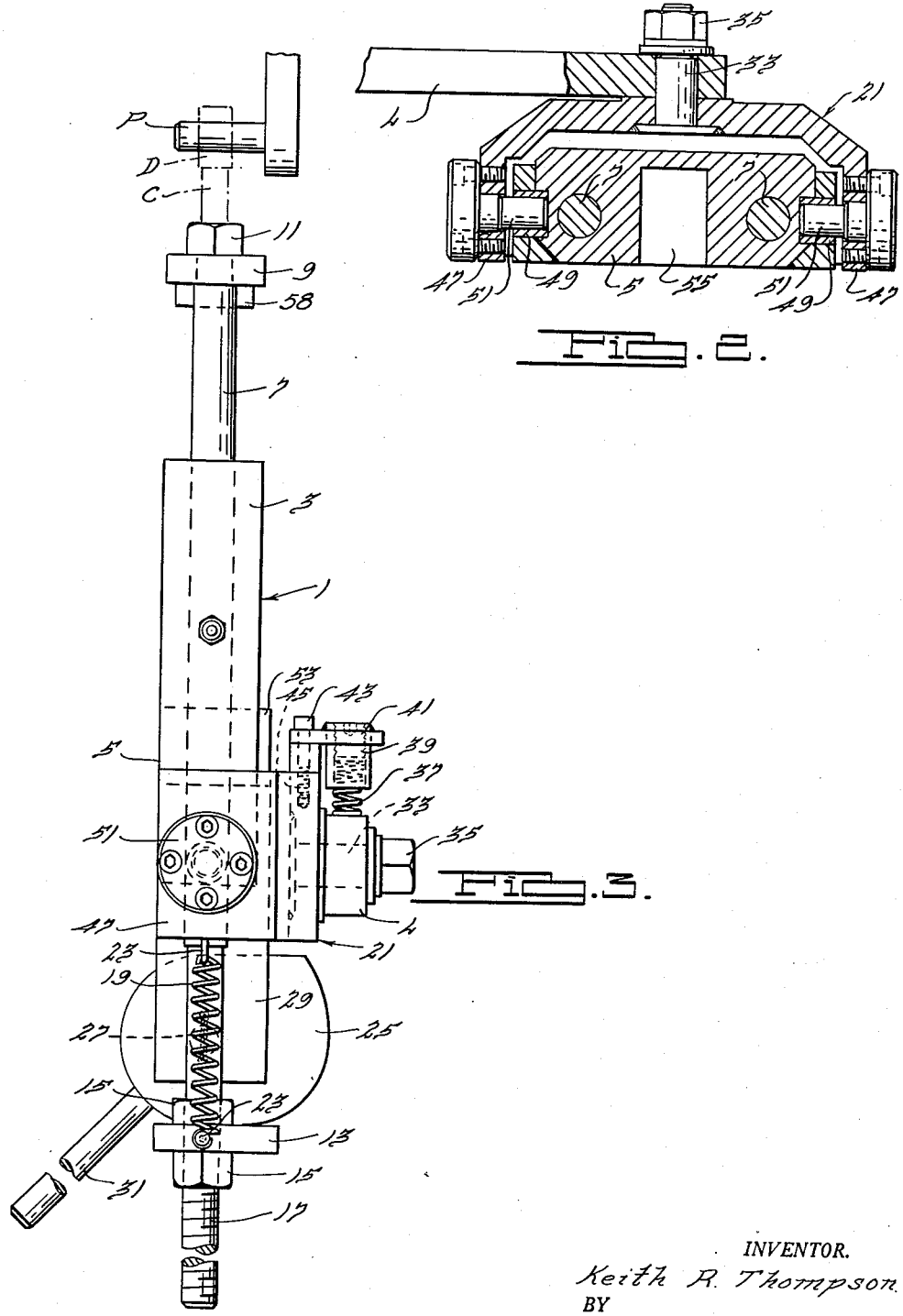
INVENTOR.
Keith R. Thompson
BY
Harness, Dickey & Pierce
ATTORNEYS.

Patented Aug. 17, 1954

2,686,423

UNITED STATES PATENT OFFICE 2,686,423

TESTING FIXTURE FOR SHOCK ABSORBERS

Keith R. Thompson, Monroe, Mich., assignor to Monroe Auto Equipment Company, Monroe, Mich., a corporation of Michigan Application October 20, 1949, Serial No. 122,506

4 Claims. (Cl. 73—11)

This invention relates to the testing of shock absorbers and, in particular, refers to a fixture for use with testing apparatus.

Conventionally, one of the last steps in the manufacture of tubular direct acting hydraulic shock absorbers is a determination of their load-resisting characteristics. This is commonly done in a testing device by applying an axial load to an end of the piston rod while the tube end is secured to the cantilever arm of the device which draws an indicator diagram of the shock absorber's reaction to the applied load. Heretofore, this test has always been conducted after final assembly of the shock absorber. Hence if it indicated that adjustments were required, disassembly of the shock absorber was necessary.

The present invention provides a fixture for mounting on the testing device whereby such testing of the shock absorber may be done before final assembly. The fixture holds the parts when they are only loosely assembled and while they may still be disconnected without any difficulty and permits them to be tested while in that condition. Thus, adjustments required can be quickly and easily made if the test indicates that the shock absorber is defective. In mass production, this feature, which is made possible by the present invention, results in a noticeable reduction in manufacturing time and costs.

The invention is illustrated in the accompanying drawings in which:

Fig. 1 is a front elevation of the testing fixture mounted upon the cantilever arm of the testing device or apparatus for recording the reaction of the shock absorber to applied axial loads, Fig. 2 is a section taken on the line 2—2 of Fig. 1, and Fig. 3 is a side elevation of the fixture shown in Fig. 1.

The fixture has a frame 1 that is provided with a pair of bored legs 3 extending upwardly from a body 5. Slidably extending through the legs 3 are a pair of rods 7 which are fixedly interconnected at their upper ends by a crosshead 9 which is clamped against shoulders in the rods by nuts 11 that are threaded on the ends of the rods. The ends of the rods on the lower side of the frame 1 are interconnected also by a crosshead 13. The crosshead 13 is clamped to the rods by nuts 15 and is adjustable relative to the frame, since substantial portions 17 of the lower ends of the rods 7 are threaded. It will be recognized that when the frame 1 is vertically fixed as shown, the assembly of rods 7 and crossheads 9 and 13 will tend to slide downwardly under the force of gravity until the crosshead 9 abuts the tops of the legs 3. In order to prevent this, a pair of tension springs 19 are interposed between the crosshead 13 and a mounting bracket 21 which will be described hereinafter. The springs 19 are mounted on suitable pins and eyes 23 extending from the crosshead 13 and bracket 21.

Movement of the crosshead 9 toward the tops of legs 3 is actuated by a cam 25 that is pivoted at 27 between legs 29 which extend from the lower side of the body 5. The cam bears upon the upper surface of crosshead 13 and has a gradually increasing radius so that upon upward movement of its handle 31 it forces the rods 7 and crossheads 9 and 13 to move downwardly with respect to the frame 1.

The cantilever pickup arm L of the testing apparatus (not shown) carries the entire fixture of the present invention. The connection between the frame 1 and the arm L is effectuated by means of the previously mentioned bracket 21. This bracket is preferably U-shaped and its base has a stud 33 threaded at its end to receive a nut 35 whereby the bracket is clamped to the arm L, this connection being such as to permit some pivotal movement of the bracket 21 relative to the arm L. The ease with which such pivotal movement takes place may be regulated by the setting of compression spring 37 which bears upon the top edge of the arm L. The spring 37 is partially contained in a hollow retainer 39 that has a crossarm 41 which is prevented from moving away from the top edge of the bracket 21 under the influence of spring pressure by the screw 43 which has a head abutting the top of the crossarm and is threaded into the top of the bracket 21 as shown at 45. By threading the screw into the bracket 21, pressure on the pivotal connection provided by stud 33 is increased to thereby increase the resistance to pivotal movement between the arm L and bracket 21.

The frame 1 is preferably connected to the legs 47 of the bracket 21 so that it may have limited pivotal movement, which, together with the movement about pin 33, will permit self-alignment of the fixture with applied loads. For this purpose, it has bushings 49 which receive the transverse trunnions 51 that are secured in a suitable manner to the legs 47. It will be recognized that external loads on the frame 1 will be transferred through the trunnions 51 to the bracket 21 and thus to the arm L.

As indicated in dotted lines, the shock-absorber tube A fits on the frame between the crosshead 9 and an insert 53 that is provided in the body 5 between the legs 3 and which is preferably treated to resist wear. The insert 53, as well as the body 5, has suitable apertures, indicated at 55, to receive the lower loop B of the shock absorber. The insert is provided with downwardly facing shoulders 56 which, when the tube A is turned 90° from the position shown in Fig. 1, will engage the periphery of the generally circular loop B to prevent upward movement of the tube relative to the insert 53 and body. At the upper end, a pad 58 on the lower side of the upper crosshead 9 is adapted to fit inside the tube A to hold the loosely assembled parts therein during testing. The piston rod C of the shock absorber is inserted through a side-opening slot 57 in the crosshead 9 so that its loop D is above the crosshead 9 whereby it may be placed on the pin P. The pin P is raised and lowered by suitable ram mechanism (not shown) and provides the forces for testing the shock absorber.

In use, the shock absorber is inserted in the frame so that the tube A seats on the contoured surface 59 of the insert 53 and the loop B in the aperture 55 while the rod C is in the slot 57. The loop D is placed over pin P. The handle 31 is elevated and the cam 25 lowers the crosshead 9 into tight engagement with the top edge of the tube A and fits the pad 58 into the tube. The tube is therefore tightly held between the crosshead 9 and the body 5, and internal parts are held in proper position by the pad 58. Since the rod C is attached to the pin P, when the latter is moved it moves therewith and slides in the tube A. The tube A is secured to the frame 1 and thus to the arm L. Hence resistance of shock absorber to relative movement of the tube A and rod C is reflected in movement of the cantilever arm L. After the shock absorber has been tested, the handle 31 is moved downwardly to allow the springs 19 to raise the crosshead 9 from the tube A. The assembly may then be disengaged from the pin P and insert 53 and the shock absorber removed.

It will be recognized that by providing a fixture for clamping the tube A to the arm L, the present invention has made it possible to test shock absorbers before final assembly. Various modifications may be made in the structural details of the invention, hence it is not intended to limit it to the specific embodiment herein shown.

What is claimed is:

1. In a fixture for connection to a device for testing shock absorbers, the combination of a frame, parallel rods slidably mounted in the frame, a crosshead interconnecting the rods at one end, said crosshead being adapted to engage the end of a shock absorber tube, means on the frame adapted to engage the other end of the tube, said crosshead having an aperture therethrough permitting a shock absorber rod to extend therethrough, means connected to the frame and rods for moving the crosshead relative to the frame so as to clamp a tube to the fixture, and a bracket pivotally connected to the frame so that the frame may pivot about an axis transverse to the longitudinal rods and parallel to a plane through the rods, said bracket being adapted to be connected to the testing device.

2. In a fixture for connection to a device for testing shock absorbers, the combination of a frame parallel rods slidably extending through the frame, crossheads on either side of the frame interconnecting the rods, one of said crossheads being adapted to engage the end of a tube, means on the frame adapted to engage the other end of the tube, cam means between the frame and the other crosshead for moving the rods relative to the frame, a bracket for connecting the frame to the testing device, means pivotally connecting the bracket to the frame for limited pivotal movement about an axis transverse to the rods, means for pivotally connecting the bracket to the testing device, spring means exerting pressure upon the last pivotal connection of the bracket and device, and means for varying the pressure exerted by said spring means.

3. In a fixture for connection to a device for testing shock absorbers, the combination of a frame, parallel rods slidably extending through the frame, crossheads on either side of the frame interconnecting the rods, one of said crossheads being adapted to engage the end of a shock absorber tube, said crosshead having a side opening slot extending therethrough to receive a shock absorber rod, means on the frame adapted to engage the other end of the tube, cam means between the frame and the other crosshead for moving the rods relative to the frame so that the one crosshead moves toward the tube-engaging means, spring means for urging the one crosshead and the tube-engaging means apart, a bracket for connecting the frame to the testing device, and means pivotally connecting the bracket to the frame for limited pivotal movement about an axis transverse to the rods and parallel to a plane through the rods.

4. In a fixture for connection to a device for testing shock absorbers, the combination of a frame, parallel rods slidably extending through the frame, crossheads on either side of the frame interconnecting the rods, one of said crossheads being adapted to engage the end of a tube, means on the frame adapted to engage the other end of the tube, cam means between the frame and the other crosshead for moving the rods relative to the frame so that the crosshead moves toward the tube-engaging means, spring means for urging the crosshead and the tube-engaging means apart, a bracket for connecting the frame to the testing device, means pivotally connecting the bracket to the frame for limited pivotal movement about an axis transverse to the rods, means for pivotally connecting the bracket to the testing device, spring means exerting pressure upon the last pivotal connection of the bracket and device, and means for varying the pressure exerted by said spring means.

References Cited in the file of this patent

UNITED STATES PATENTS

| Number | Name | Date |
|---|---|---|
| 1,956,270 | Casper | Apr. 24, 1934 |
| 2,271,739 | Link | Feb. 3, 1942 |
| 2,362,067 | Heinrich | Nov. 7, 1944 |
| 2,420,002 | McKay | May 6, 1947 |
| 2,488,619 | Dentler et al. | Nov. 22, 1949 |
| 2,517,830 | Berlincourt | Aug. 8, 1950 |

FOREIGN PATENTS

| Number | Country | Date |
|---|---|---|
| 518,793 | Great Britain | Mar. 7, 1940 |